Nov. 23, 1965     A. DALSEY ETAL     3,219,363
MUD FLAP GUARD AND HOLDER FOR VEHICLES
Filed July 22, 1960
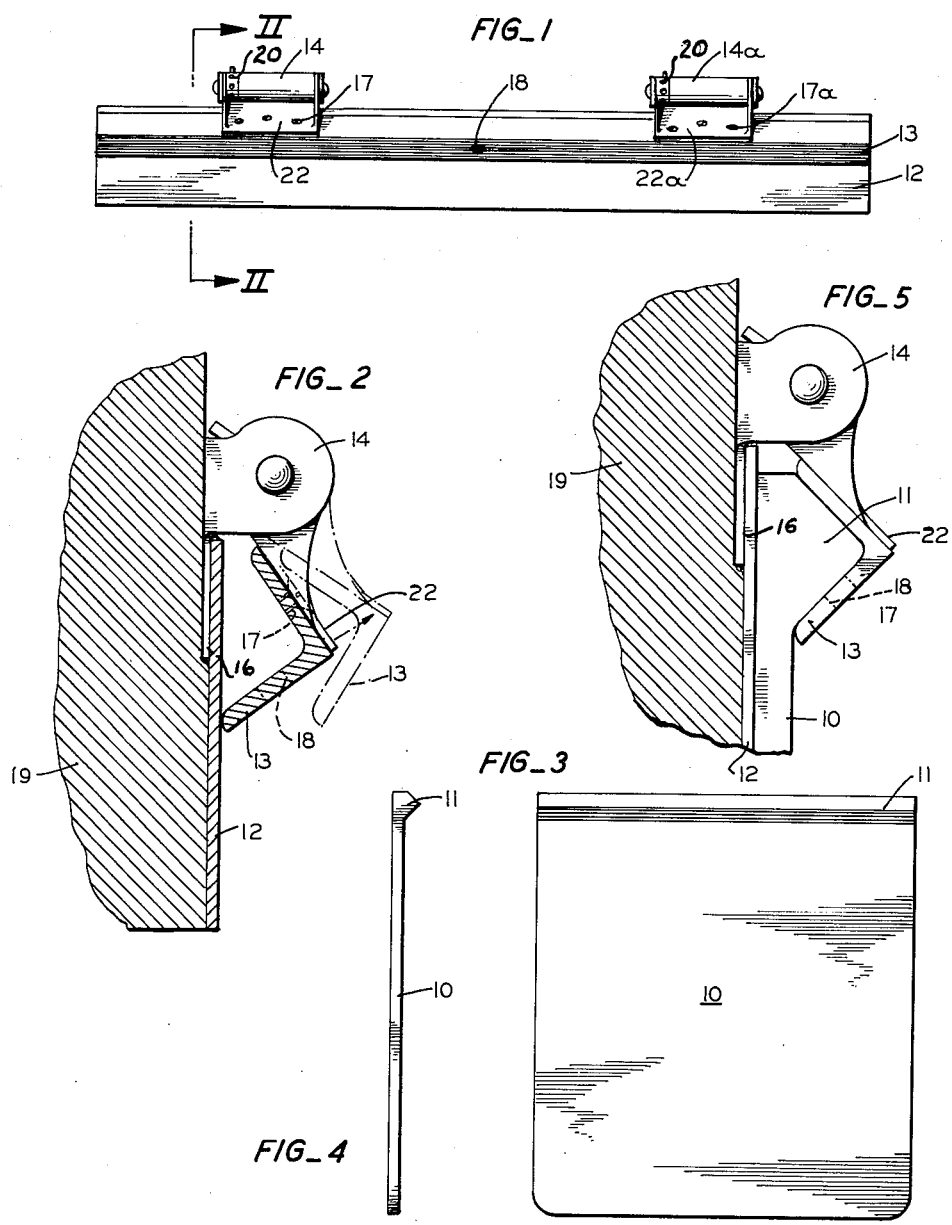
INVENTORS
ADRIAN DALSEY
LORAN DAY LASHBROOK

# United States Patent Office 3,219,363
Patented Nov. 23, 1965

3,219,363
MUD FLAP GUARD AND HOLDER
FOR VEHICLES
Adrian Dalsey, 190 Hilltop Crescent, Walnut Creek, Calif., and Loran Day Lashbrook, 466 36th St., Richmond, Calif.
Filed July 22, 1960, Ser. No. 44,748
4 Claims. (Cl. 280—154.5)

This invention relates to mud flap guards for the wheels of vehicles and means for holding such flaps, and more particularly to an inexpensive and readily attachable holding device for releasably securing the required mud flaps.

Throughout most of the United States there is a standard safety requirement that all trucks, including tractors and trailers, shall be equipped with guards or flaps adjacent and to the rear of its rear wheels so as to prevent the spray of mud, stones, and debris picked up by the tires along the highway, from being thrown back against pedestrians and particularly following vehicles. The centrifugal force of the moving vehicle's wheels dislodges and hurls the material picked up by the tire treads with such force that much damage and injury has resulted therefrom. This requirement has proved to be a constant source of irritation, time loss, increase in operating expense, and a threat of criminal and civil liability to vehicle owners. This is because prior to the means here disclosed no satisfactory mud flap had been made nor had any successful means of attachment been provided.

Truck owners have also been regularly plagued with problems arising from mud flaps and holders now in use as a result of the frequent ripping of mud flaps from the fastenings by which they are held in place, or of the breaking of the fastening means which hold the mud flaps in place.

Probably one of the most frequent causes of losing mud flaps, either by ripping from the holder or having the holder itself break, results from the flaps becoming wedged between the rear wheels of the truck or the like in backing up to a loading dock. This usually occurs without being noticed by the driver, or if noticed, at a time when it is not possible to make any but the most temporary repairs.

In addition, truck owners have had to combat a frequent theft in mud flaps resulting from their common appearance and interchangeability with other trucks, thereby causing the truck driver to frequently travel long distances in violation of the law and without the required safety features. Furthermore, mud flaps are continually under criticism as an eyesore because of their rapid deterioration under constant hard and demanding intended use. Also, truck drivers have found that the usual methods of affixing flaps to the truck body by means of bolts, springs, chain links and the like, require continued shop maintenance and preclude "on the road" repairs by drivers both with respect to the flaps that have been torn from their fastenings and the damaged fastenings themselves.

It is an important object of the present invention, therefore, to provide a dependable supporting or holding device which will permit a rapid replacement of mud flaps with a minimum of effort and without the need for specialized tools.

It is another object of the present invention to provide an improved mud flap constructed of a material such as vinyl which eliminates usual failure and deterioration resulting from tearing, cracking, peeling, chipping, or fire, and in addition, is more flexible and resilient.

It is also an object of this invention to provide a means of securing a mud flap within a holder which eliminates the present need of drilling holes through such flaps, thereby eliminating the weakening of the flaps at the point of attachment and the consequential problems of rotting, cracking, ripping or tearing at these points.

Amongst the other objects of this invention is the provision of a mud flap so manufactured as to permit ease in cleaning, repel ordinary road dirt, and one which can be produced in attractive colors to suit the owner's taste or provide areas for safety slogans or advertising indicia.

It is also an object of this invention to provide a mud flap and holder combination which will reduce both time and cost of installation and maintenance of the mud flaps, and, in addition, will permit a standardization of both mud flap holders and corresponding mud flaps.

It is another object of this invention to provide a mud flap that can be used as a cheap and effective means of advertising, the subject matter of which can be readily changed or alternated due to the ease with which such flaps can be quickly detached and replaced.

It is an additional object of this invention to provide a mud flap which will provide additional safety features to that of acting as a mud guard, by serving as a reflector at night as a consequence of its smooth, nonporous surface, and as a signal by day, as a consequence of its bright, colorful appearance.

Further objects are to provide a construction of maximum simplicity, economy and ease of manufacture, also such further objects, advantages and capabilities as will fully appear and as are inherently possessed by the device and the invention described herein.

The invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

FIGURE 1 is a front elevational view of a single mud flap holder of the present invention;

FIGURE 2 is a side elevational view of the mud flap holder (on an enlarged scale), the full lines showing the closed position of the angle member in relation to the back plate and the spring loaded hinges, while the open position is shown in broken lines;

FIGURE 3 is a front elevational view of the preferred form of mud flap, showing a triangular bead running horizontally adjacent the top thereof;

FIGURE 4 is a side elevational view of the flap illustrated in FIGURE 3; and

FIGURE 5 is a side elevation similar to FIGURE 2 but with the mud flap of FIGURE 3 (shown in fragment only) being held in position.

Referring now more particularly to the drawings in which like reference numerals indicate like parts in the several views, the mud flap guards of the present invention in standard dimensions are indicated at 10. The mud flap guard 10 is constructed of a durable material and may be made from the standard rubber compounds, both natural and synthetic, but preferably from the more resistant material of suitably compounded vinyl plastics. The vinyl plastic mud flaps are preferred for numerous reasons: they are tougher and stronger in their physical properties; they can be made in many colors and combinations of colors; they can be finished with a highly reflective shiny surface and the vinyl material will not support flame as will the conventional rubber flaps. Free swinging rubber flaps are sometimes caught on the top of truck tires. The friction created by the fast moving truck tires will not only ruin the flaps but has caused the rubber flaps to flame and start fires which have damaged both the truck and its contents. The flap 10 is preferably formed with an integral bead 11 adjacent its top marginal edge, which bead projects above one surface thereof. The bead 11 is preferably triangular in section although any other suitably shaped bead will function. Although it has been stated that it is preferable to form the bead 11 integrally with the flap 10, it is apparent that the bead may be separately formed and secured in the appropriate manner by any suitable means.

The cooperating flap guard holding unit comprises a steel back plate 12 which is appropriately secured in the proper location, one at each side, to the rear of the rear wheels on the truck frame, or on the truck bed frame. Appropriately spaced along the top edge of the back plate 12 are two or more spring loaded adjustable hinges 14 and 14a. One leaf 16, of each of said hinges is appropriately secured to the back plate in any appropriate manner, such as by welding, not only to secure the hinges in position but to give a solid base against which the internal springs of said hinges may operate. The other leaves 22 and 22a of the spring hinges 14 and 14a are secured to the upper and outer surface of an inverted steel angle bar 13. It is apparent that the leaves of the hinges may be secured in any suitable manner such as by welding, or by bolting through the holes 17 and 17a. The spring hinges 14 and 14a are provided with the conventional holes 20 for tightening the tension on the internal springs thereof (not shown).

With reference to FIGURE 2, the tension of the spring hinges 14 and 14a cause the lower or under leg of the angle bar 13 to bear against the outer face of the base plate 12. The angle bar 13 may be raised against the tension of the spring hinges 14 and 14a by means of inserting an appropriate tool in the hole 18 provided in the under leg of the angle bar 13. An open position is shown in the broken line of FIGURE 2. When the holder plates 12 are properly secured in position on the truck body frame 19, the mud flaps can be installed or changed in a matter of a very few minutes by the driver or maintenance employee inserting a screw driver, a small bar or a simple tool at least five inches long into the hole 18 and using this leverage to raise the angle bar to the open position against the tension of the spring hinges 14 and 14a. The reason that a tool is required to raise the angle bar 13 to the open position is that the springs of the hinges are placed under a substantial degree of tension so as to exert a pressure of approximately 100 pounds or greater.

When the angle bar 13 is raised to the open position, the flap 10 is inserted upwardly between the back plate 12 and the angle bar 13 so that the bead 11 upon release of the tension will be confined within the space defined by the open ends of the angle bar legs, over its entire width. Upon release of the open angle bar 13, the same will bear against the outer face of the mud flap guard 10 and hold it with its pressure against the back plate 12 with the bead 11 confined as above stated thereby holding the mud flap guard 10 securely in position.

It is thus apparent that in the event the mud flap 10 becomes wedged between the wheels of the backing truck and a curb or loading dock, a downward pull of 100 pounds or greater will overcome the tension of the springs in hinges 14 and 14a and release the mud flap guard 10 thereby preventing damage to either the flap or the flap holder. In this manner any untoward or accidental strain which would otherwise tear the mud flap guard from its mounting, pulls against the holding pressure of the lower leg of the angle bar 13, and when the same exceeds the value of the spring holding, the flap 10 with its bead 11 is pulled free and separated from the holder without damage to either the holder or the flap. The flap may then be reinserted quickly in the manner hereinbefore indicated without the necessity of returning to the maintenance shop for repairs or replacement.

Certain types of equipment require frequent changing or even the elimination of the flaps under varying circumstances. For example, in a tractor trailer rig, flaps are required on the rear wheels of the trailer only. However, when the tractor is operated without a trailer, flaps are required on the rear tractor wheels. With the present invention it will be seen that this interchange and adaptation can be made quickly by the driver without the necessity of a repair man or maintenance crew man to effect the substitution or change of location of the mud flaps, or the temporary lay up of the vehicle.

It will be observed that each and all of the objectives as well as those inherently possessed by the present invention are accomplished by the cooperation of the elements of this invention.

I claim:

1. A mud flap guard and holder, comprising in combination a backing plate, a movable right angle bar having upper and lower leg portions with the opening therebetween directed toward the backing plate and with the terminating edge of the upper leg portion adjacent the upper edge of said backing plate and the terminating edge of the lower leg portion overlying the backing plate, one or more spring loaded hinges having two leaves, one of which is secured to the backing plate and the other to the upper leg portion of the angle bar, and a mud flap guard of flexible sheet material retained by pressure of the lower terminating edge of said angle bar against said backing plate.

2. A mud flap guard and holder, comprising in combination a backing plate, an inverted movable right angle bar having upper and lower leg portions with the opening therebetween directed toward the backing plate and with the terminating edge of the upper leg portion adjacent the upper edge of said backing plate and the terminating edge of the lower leg portion overlying the backing plate, one or more spring loaded hinges having two leaves, one of which is secured to the backing plate and the other to the upper leg portion of the angle bar, and a mud flap guard of flexible sheet material having a bead protruding outwardly from the surface along one marginal edge which bead is retained between the legs of said angle bar by the pressure of the lower terminating edge of said angle bar against said backing plate.

3. A mud flap guard and holder, comprising in combination a fixed backing plate, an inverted movable right angle bar having upper and lower leg portions with the opening therebetween directed toward the backing plate and with the terminating edge of the upper leg portion adjacent the upper edge of said backing plate and the terminating edge of the lower leg portion overlying the backing plate, one or more spring loaded hinges exerting a closing pressure toward the backing plate of approximately 100 pounds having two leaves, one of which is secured to the backing plate and the other to the upper leg portion of the angle bar, and a mud flap guard composed of a durable flexible substance such as vinyl sheeting, having a bead protruding outwardly from the surface along one marginal edge the same being retained between the legs of said angle bar by the pressure of the lower terminating edge of said angle bar against said backing plate.

4. A mud flap guard and holder, comprising in combination a fixed backing plate, an inverted movable right angle bar having upper and lower leg portions with the opening therebetween directed toward the backing plate and with the terminating edge of the upper leg portion adjacent the upper edge of the lower leg portion overlying the backing plate, a plurality of hinges exerting a closing pressure toward the backing plate of approximately 100 pounds and having two leaves, one of which is secured to the backing plate and the other to the upper leg portion of the angle bar, and a mud flap guard composed of a durable flexible substance such as vinyl sheeting, having a bead of triangular section protruding outwardly from the surface along one marginal edge, said bead being adapted to engage in and conform to the space between the leg portions of the right angle bar, the same being retained between by the pressure of the lower terminating edge of the lower leg portion of said angle bar against said backing plate with the protruding bead nested within the legs of said angle bar.

References Cited by the Examiner

UNITED STATES PATENTS

| | | | |
|---|---|---|---|
| 1,497,871 | 6/1924 | Peterson | 24—253 |
| 2,059,869 | 11/1936 | Holecek. | |
| 2,533,974 | 12/1950 | Szabo | 248—226.3 |
| 2,619,363 | 11/1952 | Wenham et al. | 280—154.5 |
| 2,683,612 | 7/1954 | Bacino | 280—154.5 |
| 2,755,484 | 7/1956 | Hotz | 160—392 X |
| 2,777,710 | 1/1957 | Panchesine | 280—154.5 |
| 2,865,655 | 12/1958 | Boysen | 280—154.5 |
| 2,935,336 | 5/1960 | Case | 280—154.5 |

FOREIGN PATENTS

| | | |
|---|---|---|
| 493,696 | 2/1950 | Belgium. |
| 1,090,592 | 10/1954 | France. |
| 529,565 | 7/1931 | Germany. |
| 321,968 | 10/1934 | Italy. |

A. HARRY LEVY, *Primary Examiner.*

WILLIAM J. KANOF, PHILIP ARNOLD, LEO FRIAGLIA, *Examiners.*